July 18, 1939.  A. C. CATLAND  2,166,462
CORE DRILL HEAD
Filed May 2, 1938  2 Sheets-Sheet 1
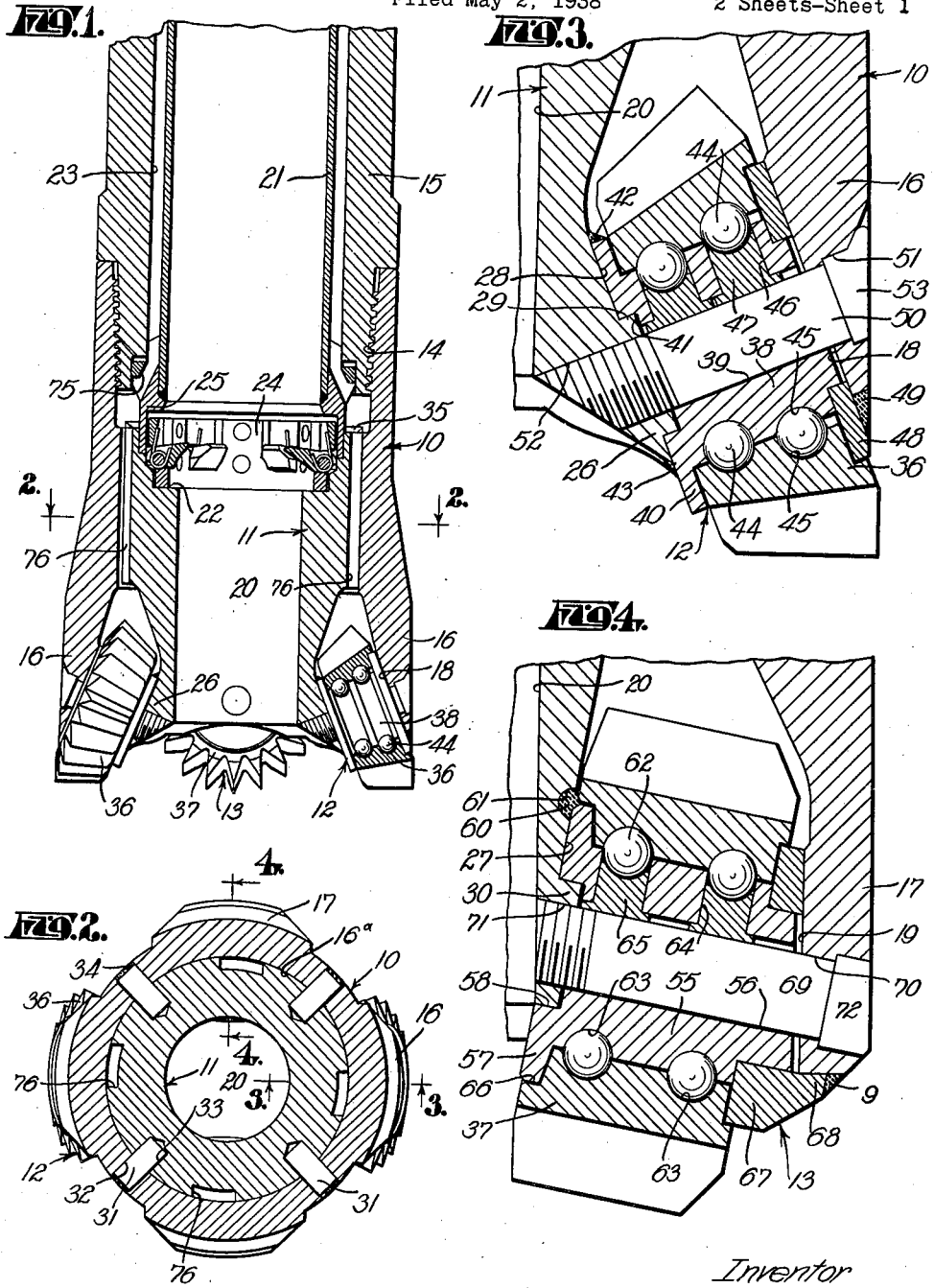
Inventor
ALFRED C. CATLAND
By
His Attorney July 18, 1939.   A. C. CATLAND   2,166,462
CORE DRILL HEAD
Filed May 2, 1938   2 Sheets-Sheet 2
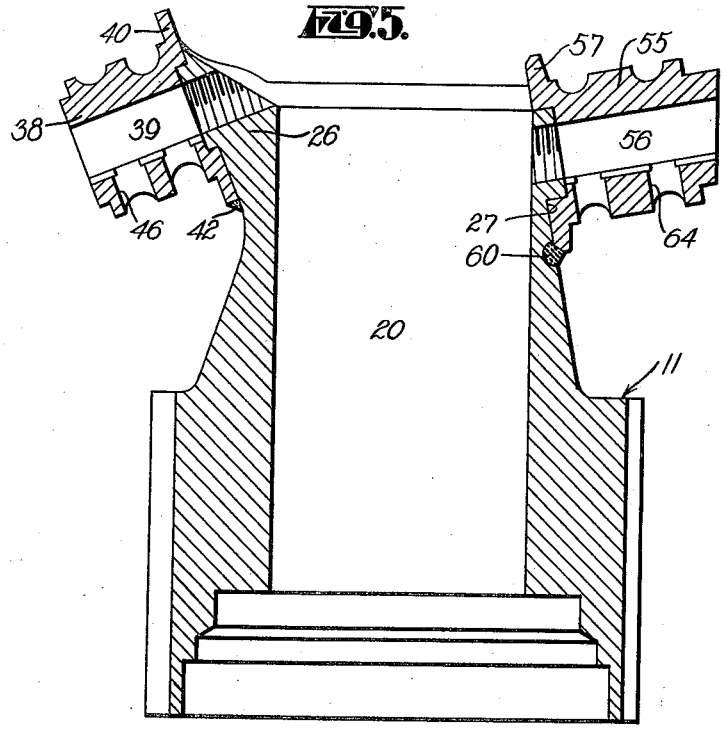
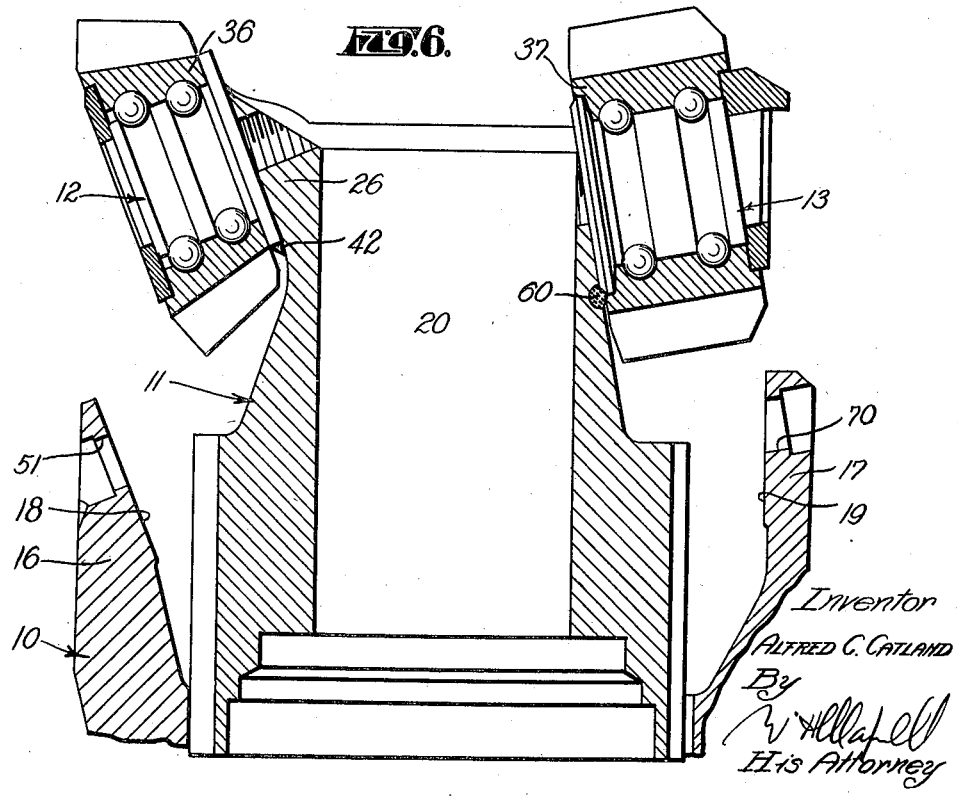
Inventor
Alfred C. Catland
By
His Attorney Patented July 18, 1939

2,166,462

UNITED STATES PATENT OFFICE 2,166,462

CORE DRILL HEAD

Alfred C. Catland, Alhambra, Calif., assignor to Globe Oil Tools Company, Los Nietos, Calif., a corporation of California Application May 2, 1938, Serial No. 205,501

14 Claims. (Cl. 255—72).

This invention relates to well drilling tools and relates more particularly to heads for rotary core drills. A general object of this invention is to provide a strong dependable and easily reconditioned core drill head.

Another object of this invention is to provide a rock core drill head in which the cutter mountings are particularly strong and rigid.

Another object of this invention is to provide a rock core drill head in which the body parts as well as the cutters, bearings, etc., may be economically replaced to recondition the head for re-use.

Another object of this invention is to provide a core drill head of the character mentioned embodying an inner body section and an outer body section rigidly and dependably secured together but easily separated after operation for individual repair or replacement or to facilitate the replacement of the cutters, etc.

Another object of this invention is to provide a core drill head in which the cutters, bearings and other parts may be easily removed for repair or replacement without materially injuring the parts.

Another object of this invention is to provide a rock core drill head embodying bearing elements for the cutters that are welded to one of the body sections and the bearing elements and said section are heat treated subsequent to the welding operation to relieve all stresses resulting from the welding operations so that the bearing elements are in effect integral with the body section and are hard-faced to be long-wearing.

Another object of this invention is to provide a readily reconditioned core drill head of the character mentioned in which the body sections are simple, inexpensive tubular elements.

Another object of this invention is to provide a core drill head of the character mentioned in which the inner body part may be replaced and the cutters may be replaced to adapt the core drill for the forming and reception of cores of different diameters.

A further object of this invention is to provide a rock core drill in which extensive surfaces are provided on the head body to assume the thrusts and forces from the cutter bearing members.

The various objects and features of my invention will be fully understood from the following detailed description of a typical preferred form and application of the invention, throughout which description reference is made to the accompanying drawings, in which:

Fig. 1 is a longitudinal detailed sectional view of the lower portion of a core drill embodying the head provided by the invention. Fig. 2 is a horizontal detailed sectional view taken as indicated by line 2—2 on Fig. 1. Fig. 3 is an enlarged fragmentary vertical detailed sectional view of one of the outer cutters, its bearing means and the adjacent body parts, being a view taken on line 3—3 on Fig. 2. Fig. 4 is an enlarged fragmentary vertical detailed sectional view taken as indicated by line 4—4 on Fig. 2, illustrating one of the inner cutters, its bearing means and the adjacent body parts. Fig. 5 is an enlarged longitudinal detailed sectional view of the inner body section with the bearing members connected thereto and in an inverted position and showing a bearing member for an inner cutter and a bearing member for an outer cutter diametrically opposite to better illustrate the invention, and Fig. 6 is a fragmentary view similar to Fig. 5 showing the cutters assembled on the bearing members and illustrating the manner in which the inner body section is introduced into the outer body section.

The well tool construction of the present invention is susceptible of embodiment in well drilling tools of various types. In the following detailed description I will describe the invention embodied in a head of a rock core drill for use in the rotary method of well drilling, it being understood that this description is merely illustrative of an application of the invention and is not to be construed as restricting the invention beyond the scope of the claims.

The embodiment of the invention illustrated in the drawings may be said to comprise, generally, an outer body section 10, an inner body section 11, roller cutter assemblies 12 and 13 carried by the sections 10 and 11 and other parts the details and functions of which will be hereinafter described.

The outer body section 10 is a tubular member adapted to be secured to the lower end of the barrel of a core drill. In the preferred construction the section 10 is an integral one-piece member. The section 10 has means at its upper end for connecting it with the core barrel or other parts of the drill. In the particular case illustrated the section 10 has a socket 14 in its upper end receiving the tapered threaded pin on the lower end of a bottom sub 15. The sub 15 may be considered as the lower part or member of the outer barrel of the drill. The longitudinal opening 16ᵃ of the tubular section 10 extends downwardly from the socket 14 to the lower end of the section. The lower end of the outer body section 10 is shaped to assist in supporting the cutter assemblies 12 and 13. Two diametrically opposite downwardly and outwardly projecting legs or wings 16 are formed on the lower end of the section 10 and the lower end of the section 10 has two diametrically opposite legs or wings 17 spaced substantially 90° from the wings 16. The wings 16 and 17 are preferably integral parts of the tubular section 10. The inner sides of the wings 16 have downwardly and outwardly inclined bearing surfaces 18 and the inner sides of the wings 17 have substantially vertical bearing surfaces 19.

The inner body section 11 is removably arranged or secured in the tubular outer section 10. In the core drill head illustrated the section 11 is a tubular sleeve-like part arranged in co-axial relation to the outer section 10. The central longitudinal opening 20 of the section 11 is open at its lower end to receive the core and is open at its upper end to pass the core into the body or barrel of the drill. The upper end of the inner section 11 occurs in or adjacent the plane occupied by the bottom wall of the socket 14 and the lower end of the section 11 is in or above the plane occupied by the lower ends of the wings 16 and 17. The portion of the core drill illustrated in Fig. 1 includes an inner barrel 21 for receiving the core. A collar 25 is provided on the lower end of the inner barrel 21 and is supported in a socket 22 in the upper end of the inner body section 11 of the head. The inner barrel 21 is spaced inwardly from the internal surface of the outer barrel sub 15, leaving an annular passage 23 for handling the circulation fluid. A suitable core catcher 24 may be arranged in the socket 22 and the collar 25 of the inner barrel 21.

The lower portion of the inner body section 11 is polygonal or substantially rectangular in external configuration. Two diametrically opposite lug-like wings 26 are provided on the lower portion of the section 11 to oppose the wings 16 and two diametrically opposite bearing faces 27 are provided on the lower portion of the section 11 to oppose the wings 17. The wings 26 have flat downwardly and outwardly inclined faces 28 opposing and substantially parallel with the surfaces 18 of the wings 16. An upwardly and outwardly projecting boss 29 is provided on each face 28. The faces 27 on the exterior of the body section 11 slope downwardly and inwardly to the lower end of the section 11. The faces 27 face or are directly opposite the surfaces 19 of the wings 17. A downwardly and outwardly inclined boss 30 is provided on each face 27. The extreme lower end of the inner section 11 may be bevelled-off or inclined downwardly and outwardly as illustrated in the drawings. It is to be observed that the two body sections 10 and 11 of the head are simple sturdy tubular elements.

The inner and outer body sections 10 and 11 are rigidly but detachably connected. The means for detachably securing together the sections 10 and 11 includes dowels 31 arranged through radial openings 32 in the outer section 10 and extending into radial sockets 33 in the inner section 11. Welds 34 preferably occupy the outer portions of the openings 32 to secure the dowels 31 in place. The dowels 31 connect or assist in connecting the two body sections 10 and 11 against relative longitudinal movement. The means for connecting the two body sections 10 and 11 further includes welding 35 joining the upper end of the inner section 11 with the outer section 10. The welding 35 occurs in the bottom of the socket 14 and connects the upper surface of the section 11 with the lower wall portion of the socket 14. The weld or welding 35 may be continuous and may be substantially annular. The welding 35 dependably and rigidly connects the upper portions of the two sections 10 and 11. It is to be noted that the welding 35 is accessible for cutting or removal when the section 10 is disconnected from the sub 15. The lower end portions of the body sections 10 and 11 are connected at or by the cutter assemblies 12 and 13 as will be subsequently described.

The cutter assemblies 12 and 13 are arranged between the spaced lower portions of the body sections 10 and 11 and constitute the active or cutting means of the head. There is a cutter assembly 12 arranged between each set of opposing wings 16 and 26 and a cutter assembly 13 is arranged between each set of a wing 17 and a face 27. The cutter assembly 12 may be termed the outer cutter assembly and the cutter 13 may be termed the inner cutter assembly. Each assembly 12 includes a frusto-conical outer cutter 36 for cutting the bore to gauge and for forming the outer portion of the well bore. Each cutter assembly 13 includes a cylindrical roller cutter 37 for trimming the core and for assisting in making the annular cut in the earth formation.

The outer cutter assemblies 12 include tubular bearing members 38 secured to or joined with the wings 26 of the inner body section 11. The members 38 are tubular spool-like elements having central longitudinal openings 39. An annular radial flange 40 is provided on the inner end portion of each member 38, and these flanges increase or broaden the inner end faces of the members 38. The bearing members 38 are arranged with their inner ends against or in contact with the faces 28 of the wings 26. Due to the inclination of the faces 28 the bearing members 38 project upwardly and outwardly with respect to the longitudinal axis of the head. Sockets 41 are provided in the inner ends of the members 38 to receive the bosses 29. The walls of the sockets 41 cooperating with the bosses 29 assist in transmitting the thrusts or forces between the bearing members 28 and the inner body section 11.

In accordance with the invention the bearing members 38 are joined with the wings 26 by welding. Welds 42 connect the flanges 40 with the wings 26. The welds 42 continue around the periphery of the flanges 40, the entire extent of the engagement of the flanges with the faces 28. If desired or believed necessary welds 43 may connect the lower end portions of the wings 26 with the inner ends of the bearing members 38. Following the welding of the bearing members 38 to the wings 26 the assembly of the section 11 and the bearing members is heat treated to remove the stresses resulting from the welding operations so that the bearing members are in effect made integral parts of the section 11. The heat treatment just mentioned will be more fully described. The bearing members 38 secured to the wings 26 as described above project outwardly from the wings to have their outer ends adjacent the surfaces 18 of the wings 16.

The cutters 36 surround the bearing members 38 and are supported thereon for free rotation. In the preferred construction illustrated series of balls 44 are arranged in longitudinally spaced annular races 45 formed in the interior of the cutters 36 and the peripheries of the bearing members 38. Radial openings 46 extend outwardly from the openings 39 to the races 45 to admit the balls 44 to the races. Plugs 47 are arranged in the openings 46 to close the same to prevent the displacement of the balls 44. The openings 46 are preferably provided in the upper portions of the bearing members 38. The races 45 are of such depth that the balls 44 operate to transmit the end thrusts in both directions between the cutters 36 and the bearing members 38 and of course operate to transmit the radial thrusts. The outer end portions of the bearing members 38 are reduced in diameter to carry washers 48. The washers 48 are engaged against the surfaces 18 of the wings 16. Welds 49 secure the washers 48 to the lower ends of the wings 16. The washers 48 assist in closing the outer ends of the cutters 36.

It is preferred to employ bolts or pins 50 to tie the opposing wings 16 and 26 together to assist in connecting the body sections 10 and 11 and to assist in supporting the bearing members 38. The bolts or pins 50 are passed inwardly through openings 51 in the wings 16 and are passed through the openings 39 in the bearing members 38 to have their inner portions threaded in openings 52 in the wings 26. Heads 53 on the outer ends of the pins 50 are received in the openings 51. The openings 51 and 52 are inclined downwardly and inwardly with respect to the vertical axis of the head to have the same inclination as the openings 39. When the pins 50 have been threaded down or tightened their heads 53 may be peened over into lateral portions of the openings 51 to lock the pins against unthreading. The pins 50 are effective in tying the wings 16 and 26 together to assist in connecting the lower portions of the body sections 10 and 11. Further, it will be seen that the pins 50 aid in supporting the bearing members 38 and in transmitting the thrusts from the bearing members to the body wings 16 and 26. The pins 50 may be tightened down so that the assemblies of the members 38 and the washers 48 are clamped between the pairs of opposing surfaces 18 and faces 26. The outer cutters 36 rotatably mounted as just described project downwardly beyond the lower ends of the wings 16 and 26 and extend outwardly beyond the wings 16 to cut the bore to gauge.

The inner cutter assemblies 13 include bearing members 55 secured to or joined with the inner body section 11. The bearing members 55 are tubular spool-like elements having central longitudinal openings 56. The members 55 are arranged with their inner ends against the faces 27 and project downwardly and outwardly toward the surfaces 19 of the wings 17. The outer ends of the members 55 are at or adjacent the surfaces 19. Annular radial flanges 57 are provided on the inner end portions of the bearing members 55 and the inner ends of the members 55 have sockets 58 receiving the bosses 30. The flanges 57 increase the diameter of the inner ends of the members 55 so that the members have extensive engagement with the faces 27. The walls of the sockets 58 cooperating with the bosses 30 assist in the transmission of forces between the members 55 and the inner body section 11. With the particular arrangement of parts illustrated the members 55 and their flanges 57 project downwardly beyond the lower end of the body section 11.

In accordance with the invention the bearing members 55 are integrally joined or connected with the body section 11 by welds. The welds 60 are preferably continuous and extend throughout the lines of contact of the flanges 57 with the faces 27. Grooves 61 may be formed in the faces 27 to receive the welds 60 so that the welds are more effective in dependably joining the members 55 with the body section 11. Subsequent to the welding of the bearing members 55 to the section 11 and subsequent to the welding of the members 38 to the wings 26 as described above the member 11 with the attached bearing members is heat treated. This heat treatment has two important objects, namely, the relieving or removal of the stresses incident to or resulting from the welding operations, and second, the final heat treatment of the bearing members 38 and 55 to give them hard wearing faces or surfaces. The relieving of the stresses resulting from the welding operations provides a structure in which the bearing members 38 and 55 are in effect integrally joined with the inner body section 11.

The inner cutters 37 surround the bearing members 55 and are supported thereon for free rotation. In the preferred construction series of balls 62 are arranged in longitudinally spaced races 63 formed in the bearing members 55 and the interiors of the cutters 37. The balls 62 serve to support the cutters 37 on the bearing members 55. The balls 62 have extensive cooperation with the races 63 and are operable to transmit the end thrusts in both directions between the cutters 37 and the members 55 and of course transmit the radial thrusts. Radial openings 64 extend outwardly from the openings 56 to the races 63 to admit the balls 62 to the races. Plugs 65 are arranged in the openings 64 to retain the balls 62 in the races 63. The openings 64 are preferably provided in the upper portions of the bearing members 55. The inner ends of the cutters 37 are provided with sockets 66 which receive the flanges 57. The outer end portions of the bearing members 55 are reduced in diameter to carry washers 67. The washers 67 may have lugs 68 secured to the lower ends of the wings 17 by welds 9. The washers 67 aid in closing the outer ends of the inner cutters 37.

Bolts or pins 69 are provided to tie the wings 17 to the inner body section 11 and to assist in supporting the bearing members 55. Downwardly and outwardly inclined openings 70 are provided in the wings 17 to be in alignment with the openings 56 of the bearing members 55. The pins 69 are passed inwardly through the openings 70 and 56 and have their inner portions threaded in openings 71 in the body section 11. The bosses 30 provide material for increasing the length of the openings 71. Heads 72 are formed on the outer ends of the pins 69 and are received in the openings 70. The heads 72 may be peened over to prevent unthreading of the pins. The pins 69 connect or tie together the wings 17 and the lower parts of the body section 11 and therefore assist in connecting the body sections 10 and 11. The pins 69 also assist in supporting the bearing members 55 and may transmit thrusts between the bearing members and the body sections 10 and 11. When the pins 69 are tightened down they may clamp the assemblies of the members 55 and the washers 67 between the opposing surfaces 19 and faces 27 to eliminate end play in the bearing assembly. The inner cutters 37 rotatably supported as described above, project downwardly at the opening 20 to trim the core for reception in the opening and to assist in making the annular cut in the earth formation.

The invention provides means for flushing the cutters 36 and 37 and for providing the required circulation at the bottom of the well. The collar 25 of the inner barrel 21 has ports 75 placing the passage 23 in communication with the lower open portion of the socket 14. A plurality of circumferentially spaced longitudinal grooves 76 is provided in the periphery of the inner section 11. The upper ends of the grooves 76 communicate with the socket 14 and the mouths or outer sides of the grooves are closed by the body section 10 so that the grooves form ports or ducts for carrying the circulation fluid. A duct or groove 76 discharges downwardly from a point above each cutter 36 and 37. The fluid discharged from the grooves 76 is effective in flushing the cutters and in providing turbulence in the bottom of the well.

In assembling the drill head the bearing members 38 and 55 are welded to the inner body section 11 and the body section with the attached bearing members is then heat treated as described above. The cutters 36 and 37 are then arranged on their respective bearing members 38 and 55 and the balls 44 and 62 are arranged in their respective races 45 and 63. The plugs 47 and 65 are then arranged in place to prevent the displacement of the balls 44 and 62. The washers 48 are arranged on the bearing members 38 and the washers 67 are arranged around the bearing members 55. The inner member 11 carrying the assembled parts just mentioned is then ready for insertion in the outer body section. It may be preferred to arrange the outer body section 10 in an inverted position and lower the inverted body section 11 into the section 10 as illustrated in Fig. 6 of the drawings. The sections 10 and 11 are brought to the proper relative positions and the dowels 31 are inserted through the openings 32 to cooperate with the sockets 33. The openings 39 and 56 of the bearing members 38 and 55 may be brought into alignment with the openings 51 and 70 to assure the correct alignment of the openings 32 with the sockets 33 prior to the introduction of the dowels 31. The pins 50 and 69 are then arranged in place and tightened down and if desired their heads 53 and 72 may be peened over. The welds 34, the welds 35, the welds 49 and the welds 9 may then be made and, if desired, ground to complete the assembly. The drill head may then be attached to the sub 15 for operation.

After a run or operation of the tool it may be found necessary or desirable to replace the cutters 36 and 37 or their bearing means or to replace or repair the body sections 10 and 11. The body sections 10 and 11 may be readily disconnected or detached to permit such replacement. The welds 35 may be cut or burned out and the welds 34 may be removed in a like manner. In this connection it is to be observed that the welds 35 and 34 are readily accessible and the welds 34 may be conveniently drilled out. The welds 49 and 9 may be easily cut or burned away to free the washers 48 and 67 respectively. The screws or pins 50 and 69 may then be removed so that the section 11 may be removed from within the section 10. Following the removal of the section 11 from the section 10 the cutters 36 and 37 and their bearing elements are free for removal.

The drill head of the present invention is simple to manufacture and is particularly rigid and strong. The bearing members 38 and 55 are rigidly and dependably joined within the inner body section 11 so that the bearing assemblies have great rigidity. It is to be particularly noted that all of the parts of the head are removable for replacement. For example, if the wing 26 of the inner section 11 becomes worn the inner section 11 may be removed from the outer section 10 as described above and replaced by a new or replacement inner section. It is obvious, of course, that the cutters and their several bearing elements are individually replaceable when necessary. The inner body section 11 may be replaced by a body section for receiving cores of a different diameter and the cutters may be replaced for a like purpose. If the outer body section 10 becomes excessively worn and the inner section remains in a good condition the outer section 10 may be replaced by a new or replacement section to recondition the head.

Having described only a typical preferred form and application of my invention I do not wish to be limited or restricted to the specific forms and applications herein set forth, but wish to reserve to myself any variations or modifications that may appear to those skilled in the art or fall within the scope of the following claims.

Having described my invention, I claim:

1. A core drill head comprising an outer tubular section, an inner tubular section arranged in the outer section and adapted to receive the core, an outer roller cutter rotatably mounted on the inner section to cut the bore to gauge, an inner roller cutter rotatably mounted on the inner section to cut the core to size, and vertically spaced means detachably connecting the sections against relative rotation and axial movement.

2. A core drill head comprising an outer body section, a tubular inner body section inserted in the outer section and adapted to pass the core when the head is in operation, an outer roller cutter, means for mounting the outer roller cutter on the inner section to cut the bore to gauge, an inner roller cutter, means for mounting the inner roller cutter on the inner section to cut the core to size, means for detachably connecting the first and second mentioned mounting means with the outer section following the insertion of the inner section into the outer section, and means for detachably connecting the sections.

3. A core drill head comprising an outer body section, a tubular inner body section entered in the outer section and adapted to pass the core, a plurality of bearing parts fixed to the inner section prior to its insertion in the outer section, an outer roller cutter rotatable on one of the bearing parts to cut the bore to gauge, an inner roller cutter rotatable on another of the bearing parts to cut the bore to size, means detachably connecting the bearing parts with the outer section, and means detachably rigidly securing the inner section to the outer section.

4. A core drill head comprising a one-piece outer body section, a tubular inner body section arranged in the outer section and adapted to pass the core, spaced opposing wings on the lower ends of the sections, tubular bearing members rigid with the wings on the inner section, roller cutters rotatable on the bearing members, and pins passing through the bearing members and tying the opposing wings together.

5. A core drill head comprising an outer body section, a tubular inner body section arranged in the outer section and adapted to pass the core, spaced opposing wings on the lower ends of the sections, tubular bearing members rigid with the wings on the inner section, roller cutters rotatable on the bearing members, removable pins passing through the bearing members and tying the opposing wings together to connect the lower portions of the sections, and means rigidly detachably connecting higher portions of the sections.

6. In a core drill, a barrel, a tubular body on the lower end of the barrel, and a removable assembly insertable in said body comprising a tubular section for arrangement in said body and adapted to pass the core, bearing projections on the section, and cutters rotatable on the said projections, the section having external longitudinal grooves forming fluid conducting passages.

7. In a core drill, a barrel, a tubular body on the lower end of the barrel, an assembly inserted in said body comprising a tubular section in said body adapted to pass the core, cutter assemblies carried by the section including cutters for cutting the bore to gauge, cutters for cutting the core to size, and a bearing member for each of said cutters rigid with the section, means for rigidly securing the upper portion of the section to the body, and means for securing the bearing members to the body.

8. In a core drill, a barrel, a tubular body on the lower end of the barrel, an assembly inserted in said body comprising a tubular section in said body adapted to pass the core, cutter assemblies carried by the section including cutters for cutting the bore to gauge, cutters for cutting the core to size, a bearing member for each of said cutters rigid with the section and partially supported by the body, and means at vertically spaced points for detachably rigidly securing the section to the body.

9. In a core drill, a barrel, a tubular body on the lower end of the barrel, an assembly inserted in said body comprising a tubular section in said body adapted to pass the core, tubular bearing members welded to the section, a cutter rotatable on one member for cutting the bore to gauge, a cutter on another member for cutting the core to size, and means for removably securing the assembly to the body including screws passing through the bearing members and extending between parts of the body and section.

10. In a core drill, a barrel, a tubular body on the lower end of the barrel, an assembly inserted in said body comprising a tubular section in said body adapted to pass the core, tubular bearing members welded to the section, a cutter rotatable on one member for cutting the bore to gauge, a cutter on another member for cutting the core to size, and means for removably securing the assembly to the body including threaded pins extending through the tubular bearing members, and connecting the lower portions of the section with the body, and dowels securing higher portions of the section to the body.

11. A core drill head comprising a tubular body, projecting wings on the lower end of the body, a tubular section insertable in the body, tubular bearing members rigid with and projecting from the section toward the wings, cutters rotatable on the bearing members, and connecting screws passing through the bearing members and tying together the said section and the wings.

12. A core drill head comprising a tubular body, projecting wings on the lower end of the body, a tubular section insertable in the body, tubular bearing members rigid with and projecting from the section toward the wings, cutters rotatable on the bearing members, washers on the bearing members welded to the wings, the wings and the section having openings aligned with the openings in the tubular bearing members, and screws in the aligned openings and the openings in the bearing members connecting the section with the body.

13. In a core drill head, a body section having an external face, a bearing member for supporting a cutter and having an end against said face, a radial flange on the member at said end increasing the area of said end, and welding securing the flange to the face.

14. In a core drill head, a body section having an external face, a bearing member for supporting a cutter and having an end against said face, a boss on said face, the member having a socket receiving the boss, and welding securing the member to the section.

ALFRED C. CATLAND.